US010242401B2

United States Patent
Buttolo et al.

(10) Patent No.: US 10,242,401 B2
(45) Date of Patent: Mar. 26, 2019

(54) METHOD AND APPARATUS FOR ENHANCED RENTAL CHECK-OUT/CHECK-IN

(71) Applicant: FORD GLOBAL TECHNOLOGIES, LLC, Dearborn, MI (US)

(72) Inventors: Pietro Buttolo, Dearborn Heights, MI (US); Annette Lynn Huebner, White Lake, MI (US); Jayanthi Rao, West Bloomfield, MI (US); Stuart C. Salter, White Lake, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 43 days.

(21) Appl. No.: 15/456,942

(22) Filed: Mar. 13, 2017

(65) Prior Publication Data
US 2018/0260886 A1 Sep. 13, 2018

(51) Int. Cl.
*G06K 9/00* (2006.01)
*G06Q 30/06* (2012.01)

(52) U.S. Cl.
CPC .............................. *G06Q 30/0645* (2013.01)

(58) Field of Classification Search
CPC ..... H04W 4/023; H04W 4/008; H04W 4/046; H04W 76/02; H04W 84/042; G07C 5/008; H04M 1/6091; B60R 16/037; B60N 2/002; E05B 81/74; E05B 81/56; E05B 77/26; G06Q 30/0645
See application file for complete search history.

(56) References Cited

U.S. PATENT DOCUMENTS

| 4,689,603 A * | 8/1987 | Conigliaro ........... B60K 28/063 307/10.4 |
| 2005/0102211 A1* | 5/2005 | Freeny, Jr. ............. G06Q 20/04 705/35 |
| 2011/0112969 A1* | 5/2011 | Zaid ....................... G06Q 10/02 705/50 |
| 2013/0331067 A1* | 12/2013 | Coussemaeker .. H04M 1/72569 455/412.2 |
| 2015/0032580 A1 | 1/2015 | Altermatt et al. |
| 2015/0262131 A1* | 9/2015 | Mermelstein ...... G06Q 10/1095 705/5 |
| 2015/0287130 A1* | 10/2015 | Vercollone ......... G06Q 30/0645 705/4 |
| 2016/0239922 A1 | 8/2016 | Jimenez |
| 2017/0142552 A1* | 5/2017 | Salter ..................... G07C 5/008 |
| 2017/0149946 A1* | 5/2017 | Buttolo ............... H04M 1/6091 |
| 2017/0361792 A1* | 12/2017 | Lem ........................ E05B 77/54 |

OTHER PUBLICATIONS

<<http://damageid.com/>>, Damage Assessment Software; DamageiD; Date retrieved: Nov 8, 2016; 5 Pages.

* cited by examiner

*Primary Examiner* — Amir Alavi
(74) *Attorney, Agent, or Firm* — Jennifer Stec; Brooks Kushman P.C.

(57) ABSTRACT

A system includes a processor configured to detect user proximity to a rental vehicle. The processor is also configured to instruct a user to photograph an identified portion of a vehicle. The processor is further configured to receive an image captured using a mobile device, including the processor, responsive to the instruction. Also, the processor is configured to determine if a predefined threshold correspondence between the captured image and a predefined image is met and transmit confirmation to the vehicle, responsive to the predefined threshold correspondence.

20 Claims, 3 Drawing Sheets

METHOD AND APPARATUS FOR ENHANCED RENTAL CHECK-OUT/CHECK-IN

TECHNICAL FIELD

The illustrative embodiments generally relate to methods and apparatuses for enhanced rental check-out/check-in.

BACKGROUND

With the proliferation of casual and peer-to-peer rental services, customer damage to a vehicle is an area of concern. In a traditional rental setting, the rental facility inspects a vehicle upon return, or at a minimum, a next customer taking delivery of the unit inspects the vehicle. With peer-to-peer and do-it-yourself rental, a customer often obtains the vehicle from and returns the vehicle to an unattended parking lot or city street parking space. There is typically no person to record the condition of the vehicle as it is returned. If any damage occurred, it is hard to determine when the damage happened and who caused it.

Wary customers may record, photograph and note possible damage, but it is difficult to prove when certain damage occurred (except maybe to prove that a person first documenting the damage did not cause the damage). In a scenario where five or six people use a vehicle in a day, many users may use the vehicle between any formal recordation of damage. Even if a rental agreement requests that a customer document damage, many customers may not take the time to document a vehicle condition prior to drive-away. And even if a customer initially agrees that they may be liable for undocumented damage, that same customer is likely to strenuously object if the vehicle owner attempts to charge that person for damage that person believes they did not cause.

SUMMARY

In a first illustrative embodiment, a system includes a processor configured to detect user proximity to a rental vehicle. The processor is also configured to instruct a user to photograph an identified portion of a vehicle. The processor is further configured to receive an image captured using a mobile device, including the processor, responsive to the instruction. Also, the processor is configured to determine if a predefined threshold correspondence between the captured image and a predefined image is met and transmit confirmation to the vehicle, responsive to the predefined threshold correspondence.

In a second illustrative embodiment, a system includes a processor configured to detect a user device proximate to a vehicle. The processor is also configured to communicate with the user device to send instructions for photographing a vehicle portion. The processor is further configured to receive an image, captured responsive to the instructions, from the user device and enable vehicle activation responsive to a verification that the received image shares a predefined threshold correspondence to a predefined image of the vehicle portion.

In a third illustrative embodiment, a computer-implemented method includes enabling utilization of a digital key to start a vehicle, responsive to a determination that a vehicle lighting illumination pattern is present in a video capture received from a user device. In this embodiment, the illumination pattern actuated by a vehicle in response to sending instructions, from the vehicle to the user device, to video-capture the illumination pattern. The illumination pattern may also be actuated in response to a direct request from a device user or based on other indicia, and enabling the utilization of the digital key may include enabling an already-provided digital key/code or providing a usable digital key or code, among other things.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
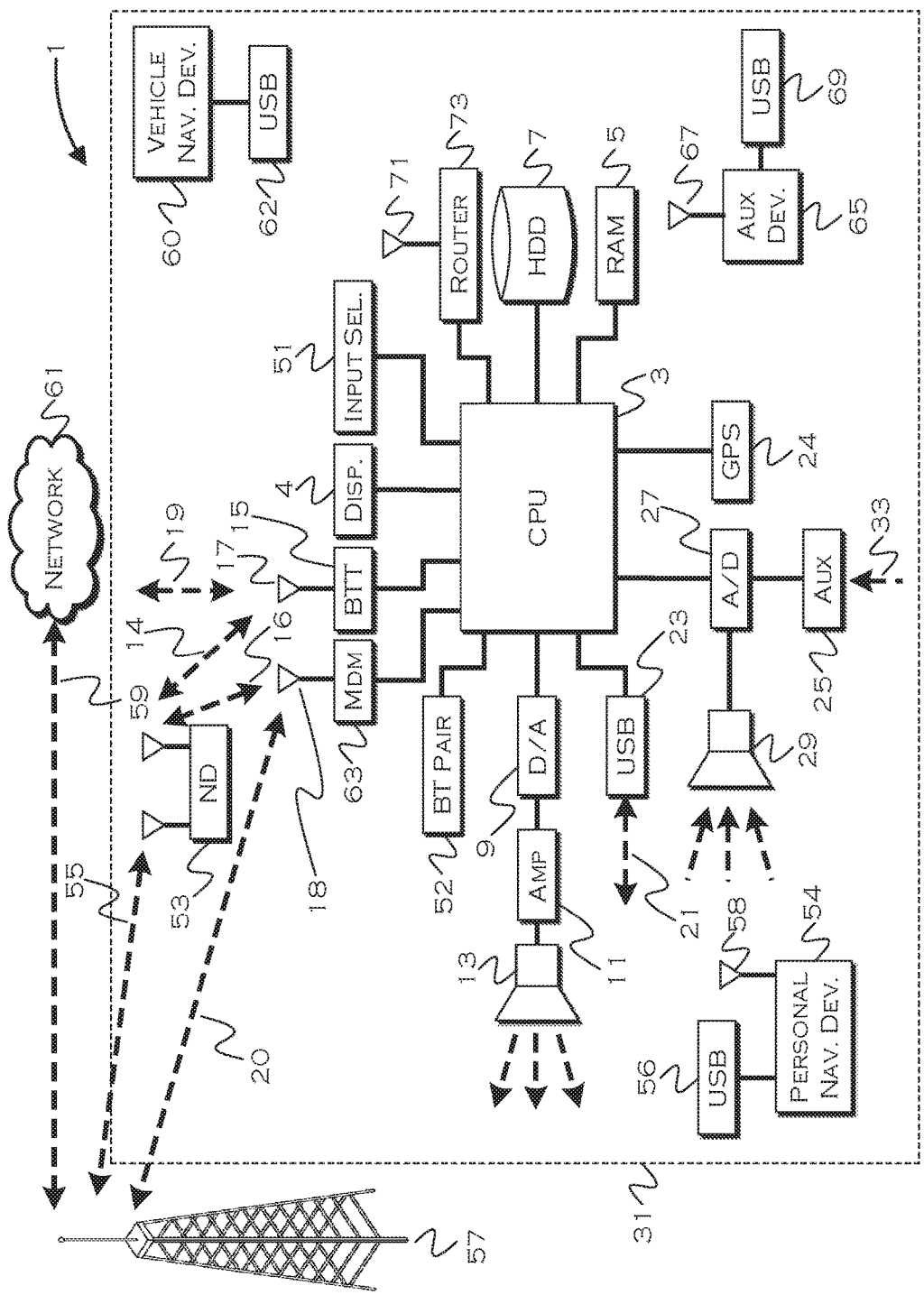
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments propose alternative solutions for sending vehicle data to the cloud when an in-vehicle embedded cellular modem is not able to send data (due to poor or no cellular coverage). The illustrative embodiments can use other devices, such as a user device, to which the data can also be transmitted. The transmitted data can include an instruction to send the data to the cloud when remote connectivity can be established. Since the vehicle to device communication will not typically be blocked by whatever is interfering with the remote cellular connection (as it is a local, relatively unimpeded signal), the vehicle is capable of transmitting data to a user device. If the user then carries the device to a location where connectivity is available, the device can then perform the remote transmission, responsive to the instructions.

The illustrative embodiments utilize a process such as an Enhanced-Rental-Module (ERM) supporting Bluetooth Low Energy (BLE) communication. The processes use this and similar modules to broadcast the presence of the vehicles to any interested party. As the user approaches a reserved vehicle, his/her personal device detects the BLE broadcast. A rental application, executing on a portable device performs an authentication handshake with the vehicle.

After a user is verified as the legitimate renter, the application may request that the user take one or more panoramic pictures/videos of all vehicle sides. These media files represent the baseline images that can be used as a match to detect any potential damage at the end of the rental period.

An image match can be done on an application running on the user's device, or on a module on the vehicle. For example, BLE communication can also be used for an upload of images from the device camera. In another example, the device or vehicle can transmit the images/video to a cloud server, using services such as Wi-Fi or LTE. The image match can both verify that the customer took the correct images as requested/required, and digitally note any possible damage to the vehicle.

It may be useful to align a camera to obtain specific images. One illustrative alignment technique relies on the use of wireframes. Another technique relies on the use of the vehicle lighting fixtures. This technique can be used as an alternative or in conjunction with the wireframe matching, and the illustrative concepts can also use other similarly suitable techniques. The light technique fixture provides an opportunity to verify that the vehicle being photographed is actually the reserved vehicle and not one that happens to be the same color/model/etc. This can be achieved through specified light patterning, that must appear in the video/image, which is an additional verification aspect to prevent fraud and/or assist in alignment.

In an exemplary wireframe alignment technique, a wireframe of the vehicle outline, stored in an application database or downloaded on a device at the time of reservation, for example, may be rendered on top of a camera image captured by the phone. The application then instructs the user to "fit" the vehicle to the wireframe by moving the camera in the proper position relative to the vehicle. Well-known image matching algorithms can be used to notify the user when the "fit" is within a certain tolerance.

A lighting alignment and verification technique utilizes vehicle lighting fixtures. For example, as the device instructs a user to collect close-up shots of individual vehicle quadrants, the rental application on the user device, e.g. smartphone, sends a request to the vehicle (via BLE or other communication medium) for the appropriate door handle and/or vehicle light to illuminate. The application displays targets on the device screen, which a user can use to match the location of the illuminated lighting fixtures of the vehicle as captured by the device camera.

As previously mentioned, this lighting technique also helps verify that the car being photographed is indeed the reserved/rented vehicle. Such a technique can be used as a stand-alone process or in conjunction with another process, such as wireframe matching.

As a user collects a desired set of images, which can include, for example, a series of images moving clockwise around a vehicle, the device can store these images as the baseline for vehicle condition at rental onset. The application may send the images, as they are taken, to the vehicle using communication such as BLE, or optional classic Bluetooth/WiFi connections. The application may also send the images to the cloud using LTE. The application can additionally simply store the images in local memory if all other options are not available. Once the user has obtained suitable and/or instructed photographs/video, the vehicle or application authorizes the user to take possession of the vehicle and drive away.

At the end of a rental, before users can conclude a rental transaction using their personal device, the user is requested/required to take another set of images of the vehicles. If the user foregoes image taking at the end of the trip, the user may be notified that any damage will automatically be assumed to have been caused by the user (or other appropriate default action may be taken).

If damage has occurred, users may try to use old images or take pictures of a similar vehicle in order to try to avoid responsibility for the damage. To assist in preventing such behavior, an authentication or instruction process can take certain measures. For example, the vehicle can flash a fixture lighting according to a pattern (and/or color) determined by an encryption key established at reservation time, which may be known to both the user's device and the vehicle, plus a time stamp. This is just one illustrative example of how verification using vehicle features can be used. Another example would be that a vehicle actuates a window to a certain level, or controls other vehicle-controllable fixture in a defined manner identifiable from a photograph or video.

In the preceding example, a phone requests that a first set of lighting fixtures be activated on the vehicle, and this can be used to align a quadrant, such as the front driver quarter of the vehicle. A clock inside the vehicle may be used, in conjunction with the encryption key, to determine and activate the correct flashing pattern. The vehicle may flash the lights with a sequence of long and short pulses. The application on the user's device determine the expected flashing sequence based on its own clock time and check for correspondence.

The process on the device may be configured to automatically capture the image captured when a match is established both on the lighting fixture matching the target position and the lighting pattern matching the expected one. If the image also matches an image recorded at the beginning of rental, the vehicle is declared undamaged. If there is an visual anomaly, a potential damage will be reported on the rental log. The vehicle may then request close up shots of an identified visually distinct region (distinct from the original). The user's device then proceeds to request lighting to be activated to align to the other vehicle quadrants. When all images are completed, the rental check-out process is complete.

A similar method can also be applied in the case of longer rental, such as one involving a more traditional rental process where the user picks up the vehicle at a staffed or otherwise maintained and monitored facility. In these situations, rentals are typically for days, not for hours, and the rental facility usually washes a vehicle before the next transaction. To visually inspect the vehicle using cameras, instead of requesting that customers collect images using their own personal device, cameras can be installed at the exit of the car wash. These cameras can strategically photograph the vehicle while the vehicle is still being carried on the tracks.

As the vehicle exits the drying stage, a processor collects images from a set of cameras (or a single moving camera), and may command both a rotating pivot and a track controller to align the vehicle to match either a wireframe or a set of lighting target, as previously discussed. In the case of an autonomous vehicle, the vehicle may drive past one or more cameras and control itself to self-align. In another example, it may be easier to have the camera move to align with a vehicle parked in a designated location, as opposed to having the vehicle align with the camera.

Figure 2:
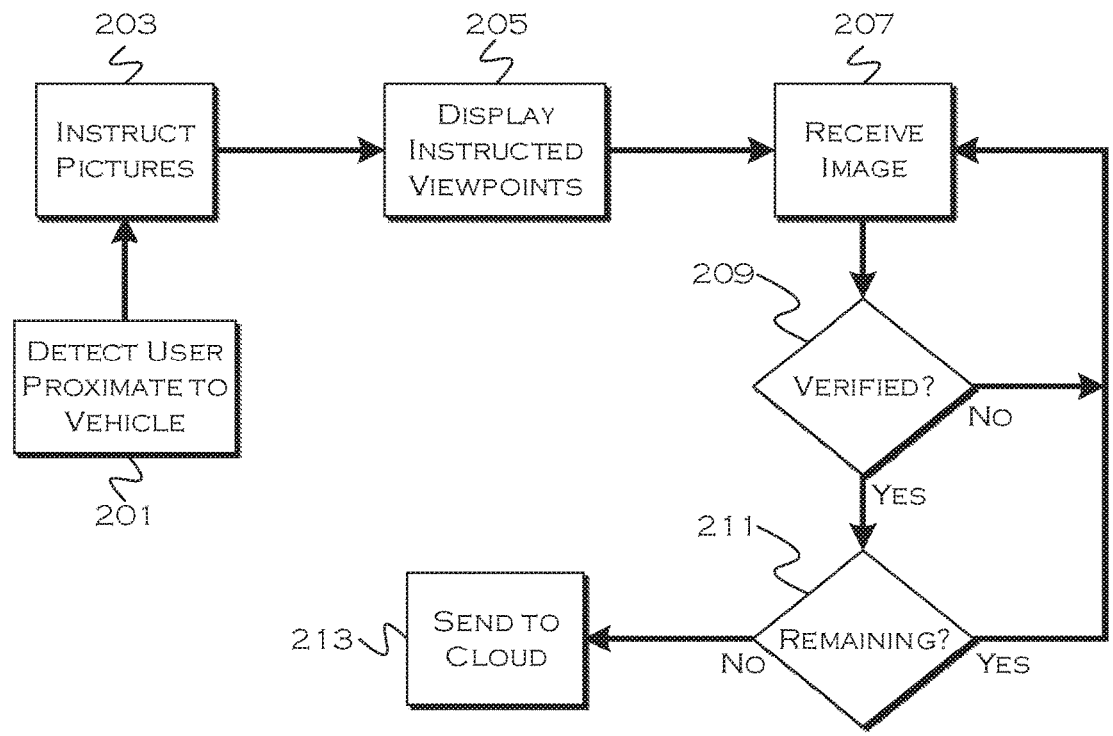
FIG. 2 shows an illustrative example of an image capture process.

FIG. 2 shows an illustrative example of an image capture process. In this example, and application running on a mobile device and/or a vehicle in communication with a mobile device, determines 201 that a user is approaching a particular vehicle. This determination can be made based on conventional communication and detection techniques, such as RSSI detection, BLE detection or through use of other known detection.

Once the process has determined that the user is suitably proximate to a vehicle, the process can begin to issue instructions for photographing the vehicle 203. This can include, for example, display 205 of one or more vehicle view-points to be photographed. The display can be a stock image of a vehicle perspective, an image of the specific vehicle (perhaps the last image recorded by a previous renter), a wireframe image of the portion of the vehicle, a graphic representation (e.g., drawing) of the perspective, or a set of text-based instructions telling the user where to photograph. Other similar variants are also possible, in order to obtain a specific set of vehicle images.

The user can use a mobile device, including a camera, to photograph an instructed image. The process then receives the image 207 and verifies that the image is correct 209. Verification can take multiple forms, in some embodiments it can be a comparison of the taken image to a stock or other vehicle image, in other examples the process may use a form of image processing to identify one or more key-stone features of a particular image. In at least one example, the process actually waits for a vehicle indicator (such as a light pattern) before snapping the image automatically, so in that case the verification may be assumed, if desired, based on recognition of the light pattern being in-frame.

If there are images remaining 211, the process repeats until all requested images are obtained and verified. Any images may then be stored locally on the device or vehicle and/or be sent to the cloud 213 by the device or vehicle.

Figure 3:
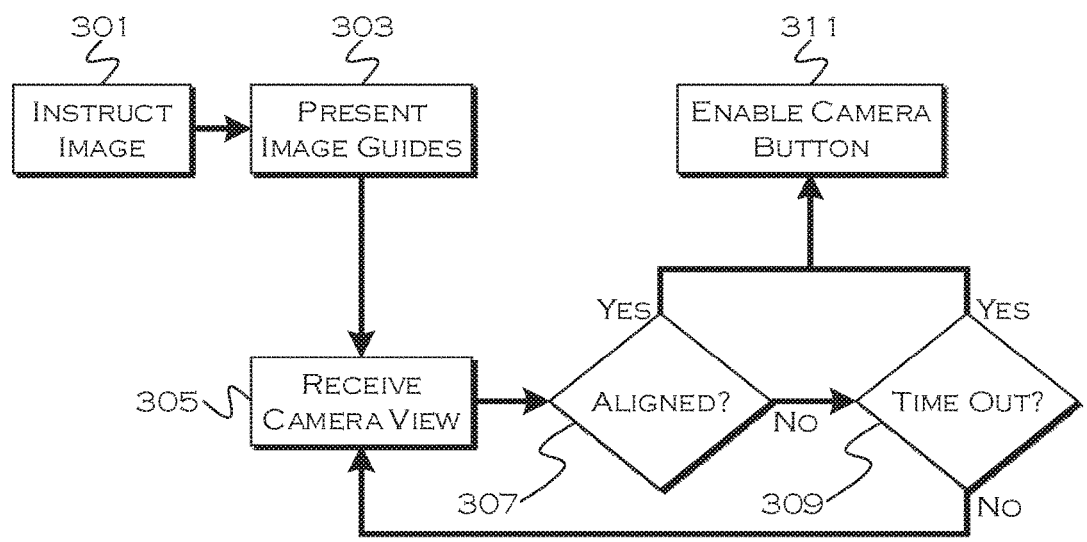
FIG. 3 shows an illustrative example of a process for image-taking instruction.

FIG. 3 shows an illustrative example of a process for image-taking instruction. In this example, the device or other process has instructed 301 a user to take an image of one portion of a vehicle or one perspective of a vehicle/vehicle portion. Since many different users may take many different images of the same portion of a vehicle, the process provides some additional guidance in this example. Here, the process presents 303 image guidelines (e.g., wireframe) that allows the user to align the perimeter of the portion to be photographed with the guidelines. At a minimum, the user may be required to "fit" the vehicle image within a certain frame, which can assist the process in performing a verification of the vehicle image.

In this example, the process receives a view of what the device camera "sees" 305 and then determines 307 if the received image is aligned with any guides. In this example, the alignment process prevents image taking until the image is properly aligned, which prevents the user from taking unaligned images and can help save time. In other examples, the camera may automatically snap the image once aligned, or there may not be prohibition on camera button usage.

Here, the process will enable the camera button once the image is aligned 311. To prevent a user from being unduly delayed, the process also includes a timeout function 309. If a predetermined alignment time period expires, the process may enable the image button. This could be useful, for example, if a vehicle is covered in snow or if there is another visual impediment that may be preventing alignment.

Figure 4:
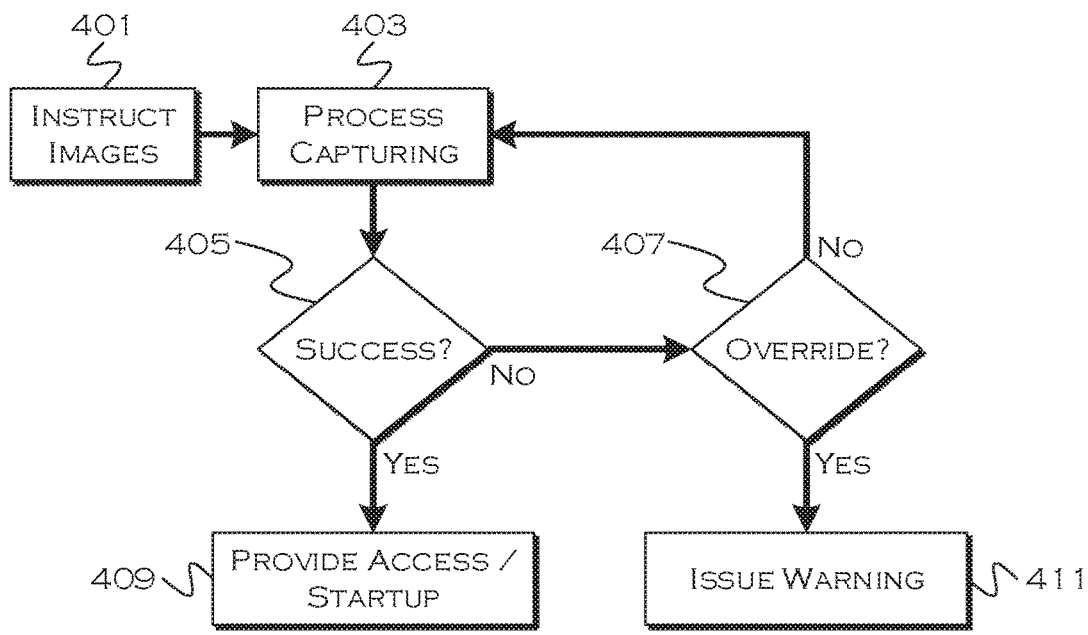
FIG. 4 shows an illustrative example of a process for vehicle drive away enablement.

FIG. 4 shows an illustrative example of a process for vehicle drive away enablement. In this example, the process instructs the user to take one or more images of a vehicle 401. For each or all instructed image, the process handles the capture and verification steps 403, such as those discussed with respect to FIG. 3. Other suitable capture and verification steps may also be used as appropriate.

Once the process has successfully verified 405 all instructed images, the process can instruct the vehicle to allow access and/or allow startup. In one example, successful verification results in digital vehicle key distribution, but it is also possible that a user has at least access to the vehicle, through a predetermined key, prior to taking the images.

In this example, there is also an override function. If the user elects override 407, the user can, for example, confirm that any damage not reported as pre-existing will automatically be attributed to the user. Upon issuance of the warning 411 and acceptance of any agreements relating to damage (if desired), the process can provide access and/or startup 409. Override may also be useful if it is raining or snowing, and the user does not wish to stand in the rain, photographing the vehicle. The override function can be used in conjunction with an explicit password or in conjunction with a digital key already obtained by the user. In one example, the digital key is issued in response to the user accepting the agreement to be held responsible for the damage.

Figure 5:
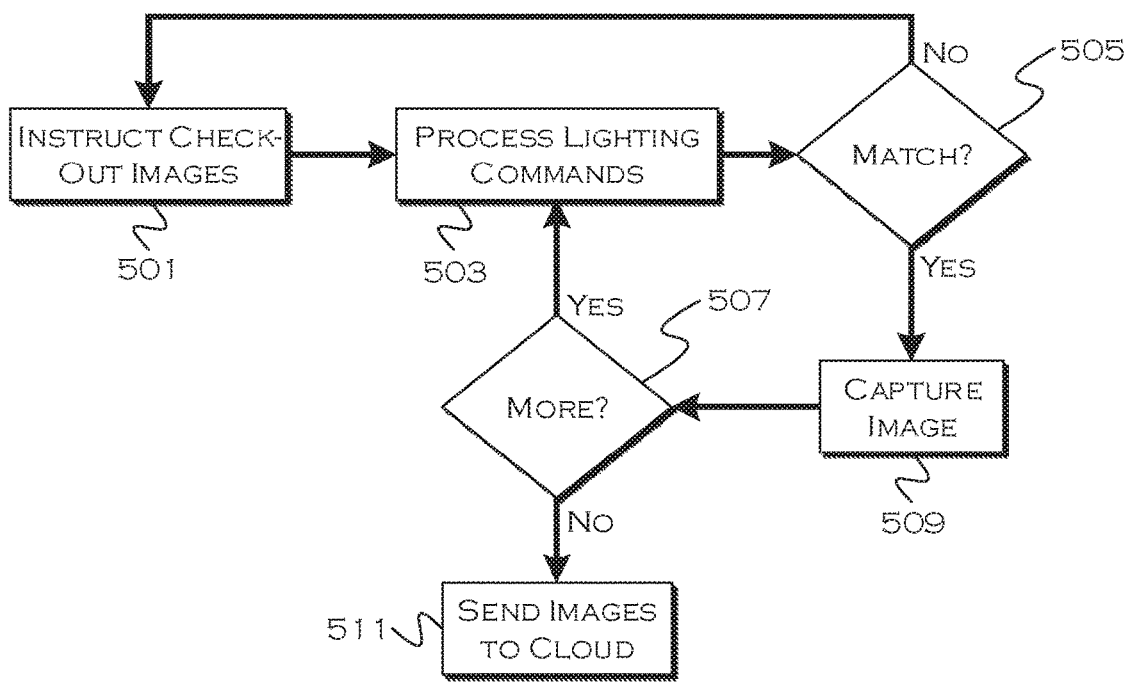
FIG. 5 shows an illustrative example of a digital check-out process.

FIG. 5 shows an illustrative example of a digital checkout process. In this example, the user is dropping a vehicle at a location corresponding to an end-of-rental. Based on user designation, timing, location, and/or some combination of these and other reasonable determinants, the process can determine that the vehicle is ready for end of rental processing.

The process instructs the user to take a series of images 501, corresponding to one or more views of the vehicle, in a manner similar to that of the initial drive away process. This can allow the process to compare these new images to any on file, and such a comparison can help identify visual incongruities, which may be representative of damage to the vehicle.

This example is shown in conjunction with a lighting command sequence, to demonstrate a practical application of such a process. The process instructs a user to take a particular image of the vehicle, and a corresponding light may be illuminated 503 on the vehicle. Thus, the image should contain at least the illuminated light, which also helps as a visual identifier as to which portion of the vehicle is to be photographed.

In another embodiment, the process may display one or more visual guides which are to be aligned with vehicle elements. So, for example, a first and second crosshairs may be aligned with a front light and door handle, respectively, to obtain a picture including a vehicle portion between the two guides. Verbal or visual instruction can direct the user as to which guides are aligned with which elements. Since the vehicle is known and fixed in size, appropriate alignment of fixedly spaced guides will virtually assure that the correct image is being taken.

In this example, once the guides are aligned and any according light or light pattern is confirmed 505, the process takes the image 509. The lighting can be static (on/off) or dynamic in nature. In one example, the lights flash in a particular sequence, which can even be determined through application of a security encryption key, so that the light sequence reflects one aspect of a public/private key or other encryption process. In other examples, certain light colors, patterns or static illuminations may be sufficient basis to determine a match.

In this example, the region around an individual crosshair or other visual guide is analyzed to determine the correspondence. This helps ensure that both alignment and correct vehicle image are present. In other examples the process may simply require that the identified light color or pattern be present in order to verify the image.

Here, the process also automatically captures the image when the appropriate light pattern and/or alignment is noted 509. If additional images remain 507, the process repeats itself. Otherwise, the process locally processes the images or sends the images to the cloud for processing.

When the images a processed, the processing system may compare original images to new images to determine any areas of concern, such as visual variations between the same vehicle-area of two different images. In instances of issue, the process can instruct the user to take a closer image of certain areas. One non-limiting example of how this could be done is to show the user the newly taken image and to highlight, circle or otherwise identify areas of issue. The user could then be asked to stand closer to these areas or zoom in, to take closer pictures.

Through use of the illustrative techniques, a reasonable process for vehicle damage accountability can be handled in the absence of a third party person who would otherwise be capable of determining and identifying damage.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
detect user proximity to a rental vehicle;
receive an image of the rental vehicle, captured using a mobile device, including the processor, responsive to an instruction to photograph an identified vehicle-portion;
determine if a predefined threshold correspondence between characteristics of the captured image and characteristics of a predefined image is met; and
transmit confirmation to the vehicle, responsive to the predefined threshold correspondence being met.

2. The system of claim 1, wherein the user proximity is detected based on a signal broadcast by the vehicle and received by a mobile device including the processor.

3. The system of claim 1, wherein the user proximity is detected based on a signal broadcast by a mobile device including the processor and responded to from the vehicle.

4. The system of claim 1, wherein the processor is configured to request that the vehicle activate a lighting feature, included in the identified vehicle-portion, responsive to the instructing the user.

5. The system of claim 4, wherein the predefined threshold correspondence being met includes verification that an active lighting characteristic, activated responsive to the request, is included in the captured image.

6. The system of claim 5, wherein the predefined threshold correspondence being met includes verification that the active lighting characteristic is aligned with a location designated by a visual guide presented on a device display as part of instructing the user.

7. The system of claim 1, wherein the processor is configured to receive a digital key or code, usable to start the vehicle, responsive to sending the confirmation.

8. The system of claim 1, wherein the processor is configured to display border guide defining a vehicle portion outline on a device display as part of instructing the user.

9. The system of claim 8, wherein the predefined threshold correspondence includes verification that a portion of the vehicle shaped as denoted by the border guide and photographed so as to fit within the border guide is present in the captured image.

10. The system of claim 8, wherein the processor is configured to disable an image capture button until a portion of the vehicle shaped as denoted by the border guide is displayed, in the process of obtaining an image to be photographed, on a device display within boundaries created by the border guide.

11. The system of claim 10, wherein the predefined threshold correspondence is met once the processor enables the image capture button responsive to the portion of the vehicle shaped as denoted by the border guide is displayed on the device display within boundaries created by the border guide and the enabled image capture button is used to capture the image.

12. The system of claim 1, wherein the processor is further configured to:
   determine any visual anomalies in the captured image, through comparison to the predefined image; and
   visually identify a determined visual anomaly as an altered display of the captured image on the device; and
   instruct the user to photograph the visually identified visual anomaly.

13. The system of claim 12, wherein the processor is configured to delay confirmation transmission until at least one image is captured responsive to the instruction to photograph the anomaly.

14. A system comprising:
   a processor configured to:
   detect a user device proximate to a vehicle;
   communicate with the user device to send instructions for photographing a vehicle portion;
   receive an image, captured responsive to the instructions, from the user device; and
   enable vehicle activation responsive to a verification that the received image shares a predefined threshold correspondence, based on a characteristic of the received image, to a predefined image of the vehicle portion.

15. The system of claim 14, wherein the predefined image of the vehicle portion is an image saved upon a previous vehicle user's cessation-of-use, captured by the previous user and transmitted to the vehicle in accordance with a check-out instruction.

16. The system of claim 14, wherein the predefined image of the vehicle portion is an image saved by a vehicle owner or manufacturer.

17. The system of claim 14, wherein the processor is configured to send a digital key or code, usable to start the vehicle, to the user device responsive to enabling vehicle activation.

18. The system of claim 14, wherein the processor is configured to determine the threshold correspondence is met based on inclusion of an activated lighting characteristic in the captured image, activated in response to the processor sending the instructions.

19. The system of claim 14, wherein the processor is configured to determine the threshold correspondence is met based on verification that a portion of the vehicle having a shape characteristic as denoted by a border guide and photographed so as to fit within the border guide, sent as part of the instructions, is present in the captured image.

20. A computer-implemented method comprising:
   enabling utilization of a digital key to start a vehicle, responsive to a determination that a vehicle lighting illumination pattern is present in a video capture received from a user device, the illumination pattern actuated by a vehicle in response to sending instructions, from the vehicle to the user device, to video-capture the illumination pattern.

* * * * *